US008943491B2

United States Patent
Brogan et al.

(10) Patent No.: US 8,943,491 B2
(45) Date of Patent: Jan. 27, 2015

(54) SYSTEMS AND METHODS FOR MAINTAINING CRTM CODE

(75) Inventors: Sean P. Brogan, Kenmore, WA (US); Sumeet Kochar, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1017 days.

(21) Appl. No.: 12/146,867

(22) Filed: Jun. 26, 2008

(65) Prior Publication Data
US 2009/0328022 A1 Dec. 31, 2009

(51) Int. Cl.
- G06F 9/44 (2006.01)
- G06F 12/08 (2006.01)
- G06F 9/445 (2006.01)
- G06F 21/57 (2013.01)
- G06F 11/14 (2006.01)

(52) U.S. Cl.
CPC .............. G06F 12/0897 (2013.01); G06F 8/66 (2013.01); G06F 8/665 (2013.01); G06F 21/572 (2013.01); G06F 8/67 (2013.01); G06F 8/65 (2013.01); G06F 11/1433 (2013.01); G06F 2212/2022 (2013.01)
USPC .......................................... 717/170; 717/169

(58) Field of Classification Search
CPC ............................................. G06F 8/65–8/665
USPC ................... 717/110–113, 168–170
See application file for complete search history.

(56) References Cited

U.S. PATENT DOCUMENTS

| | | | | |
|---|---|---|---|---|
| 5,388,267 | A * | 2/1995 | Chan et al. | 713/2 |
| 6,275,931 | B1 * | 8/2001 | Narayanaswamy et al. | 713/2 |
| 6,425,126 | B1 * | 7/2002 | Branson et al. | 717/168 |
| 6,640,334 | B1 * | 10/2003 | Rasmussen | 717/171 |
| 7,013,384 | B2 | 3/2006 | Challener et al. | |
| 7,330,977 | B2 | 2/2008 | Cromer et al. | |
| 2003/0065913 | A1 * | 4/2003 | Cepulis et al. | 713/1 |
| 2005/0108564 | A1 | 5/2005 | Freeman et al. | |
| 2005/0229173 | A1 * | 10/2005 | Mihm et al. | 717/171 |
| 2006/0010326 | A1 * | 1/2006 | Bade et al. | 713/176 |
| 2006/0161769 | A1 | 7/2006 | Hunter et al. | |
| 2007/0192580 | A1 | 8/2007 | Challener et al. | |
| 2007/0214349 | A1 | 9/2007 | Gu et al. | |
| 2007/0260866 | A1 | 11/2007 | Wang et al. | |
| 2007/0276969 | A1 | 11/2007 | Bressy et al. | |
| 2008/0077973 | A1 | 3/2008 | Zimmer et al. | |

OTHER PUBLICATIONS

Paul Congdon, et al., "Trusted Computing Overview," Powerpoint Presentation, 2004 Hewlett-Packard Development Company, L.P., pp. 15.

Steve Heil, et al, "How to Build Hardware Support for Secure Startup," Powerpoint Presentation, 2005 Microsoft Corporation, pp. 34.

\* cited by examiner

*Primary Examiner* — Lewis A Bullock, Jr.
*Assistant Examiner* — Keith C Yuen
(74) *Attorney, Agent, or Firm* — Katherine S. Brown; Schubert Law Group PLLC

(57) ABSTRACT

Embodiments comprise systems, methods and media for updating CRTM code in a computing machine. In one embodiment, the CRTM code initially resides in ROM and updated CRTM is stored in a staging area of the ROM. A logical partition of L2 cache may be created to store a heap and a stack and a data store. The data store holds updated CRTM code copied to the L2 cache. When a computing system is started, it first executes CRTM code. The CRTM code checks the staging area of the ROM to determine if there is updated CRTM code. If so, then CRTM code is copied into the L2 cache to be executed from there. The CRTM code loads the updated code into the cache and verifies its signature. The CRTM code then copies the updated code into the cache where the current CRTM code is located.

20 Claims, 3 Drawing Sheets

SYSTEMS AND METHODS FOR MAINTAINING CRTM CODE

BACKGROUND

This written description is in the field of implementing Core Root of Trust for Measurement (CRTM) software. More particularly, the description relates to updating CRTM software.

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet browser, photo-shop, games, anti-virus, as well as a host of other application programs too numerous to mention.

Trusted Computing aims to provide a level of security which is beyond the control of the PC user, and is therefore resistant to attacks which the user may deliberately or accidentally allow. It does this by employing a chip called a Trusted Platform Module (TPM) which securely stores cryptographic keys and other data. In particular, it is manufactured with a public/private key pair, known as the endorsement key (EK). The private part of that key cannot be extracted from the TPM, and records of it at manufacture time should be destroyed.

In some systems, a Core Root of Trust Measurement (CRTM) code executes from the same Read Only Memory that holds the Basic Input/Output System (BIOS). The CRTM is a BIOS boot block code. It is considered trustworthy. It reliably measures integrity values of other computer code entities and devices of the system upon Which it resides. CRTM is an extension of normal BIOS, and will be run first to measure other parts of the BIOS block before passing control. The BIOS then measures hardware, and passes control to the bootloader. The bootloader measures Operating System (OS) kernels and passes control to the OS. After the OS is loaded (or during the boot process), one can check for the Platform Configuration Register (PCR) values of a Trusted Platform Module (TPM) to see if it is running in a good (expected) configuration.

Typically, the ROM that the CRTM and BIOS is stored upon is flash memory. To store a new CRTM or other new code would require reprogramming the memory. This cannot be done while executing the CRTM or other new code. The CRTM in particular resides in flash sectors of the ROM which are locked against any writes before control is passed to the regular BIOS. The CRTM code initializes the TPM chip and extends hash data to the TPM chip for any software that is measured when the system boots, which includes main BIOS and option ROM.

For CRTM code to meet the specification of the Trusted Computing Group (TCG), it must satisfy, inter alia, two basic requirements: The flash memory update procedure to update the CRTM must be secure. This essentially means that the CRTM can only be flashed by trusted code. Trusted code is code that is digitally signed using a platform private key. The second requirement is that the area of flash that stores the CRTM must be protected against all writes at all times from all sources, and is only writeable while the CRTM code is being executed. This means that flash tools can't update the CRTM because the flash sectors are locked.

BRIEF SUMMARY

One embodiment is a system for updating Core Root Of Trust for Measurement (CRTM) code in a computing machine. The system comprises a flash Read Only Memory (ROM) to store a primary CRTM code and to store a backup CRTM code, and to store a copy of updated CRTM code. The system also comprises a cache memory to receive either primary or backup CRTM code and to provide the received CRTM code to a processor for execution when CRTM code is to be updated. The system further comprises a processor to execute CRTM code first from the ROM, and then, if CRTM is to be updated, to execute CRTM code from the cache memory. The processor further is to copy updated CRTM code from the ROM to the cache; and to copy the updated CRTM code to the ROM where the primary copy of the CRTM is stored.

Another embodiment is a method to update CRTM code in a computer. The method comprises executing a current CRTM code stored in a ROM to enable a cache memory and to determine if an updated CRTM code is available in a staging area of the ROM. If ah updated CRTM code is available, then the computer executes jump instructions in the current CRTM code to copy blocks of the current CRTM code into the cache memory. The method further comprises executing the CRTM code copied into the cache memory to copy the updated CRTM code from the staging area of the ROM to the cache memory, and to copy the updated CRTM code from the cache memory to the place in ROM where the current CRTM code is stored.

Another embodiment is a computer program product comprising a computer useable medium having a computer readable current CRTM code, wherein the computer readable current CRTM code when stored in a ROM of the computer and when executed by a processor of the computer causes the computer to update the CRTM code. The operations comprise enabling a cache memory of the computer. The operations further comprise determining if an updated CRTM code is available in a staging area of the ROM. If an updated CRTM code is available, then the operations comprise executing jump instructions in the current CRTM code to copy blocks of the current CRTM code into the cache memory. The operations further comprise executing the CRTM code copied into the cache memory to copy the updated CRTM code from the staging area of the ROM to the cache memory, and to copy the updated CRTM code from the cache memory to the place in ROM where the current CRTM code is stored.

BRIEF DESCRIPTION OF THE SEVERAL VIEWS OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments depicted in the accompanying drawings. The example embodiments are described in detail. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art.

Systems, methods and media for updating CRTM code in a computing machine are disclosed. In one embodiment, the CRTM code initially resides in ROM and updated CRTM is stored in a staging area of the ROM. A logical partition of L2 cache may be created to store a heap and a stack and a data store. The data store holds updated CRTM code copied to the L2 cache. When a computing system is started, it first executes CRTM code. The CRTM code checks the staging area of the ROM to determine if there is updated CRTM code. If so, then CRTM code is copied into the L2 cache to be executed from there. The CRTM code loads the updated code into the cache and verifies its signature. The CRTM code then copies the updated code into the cache where the current CRTM code is located.

Figure 1:
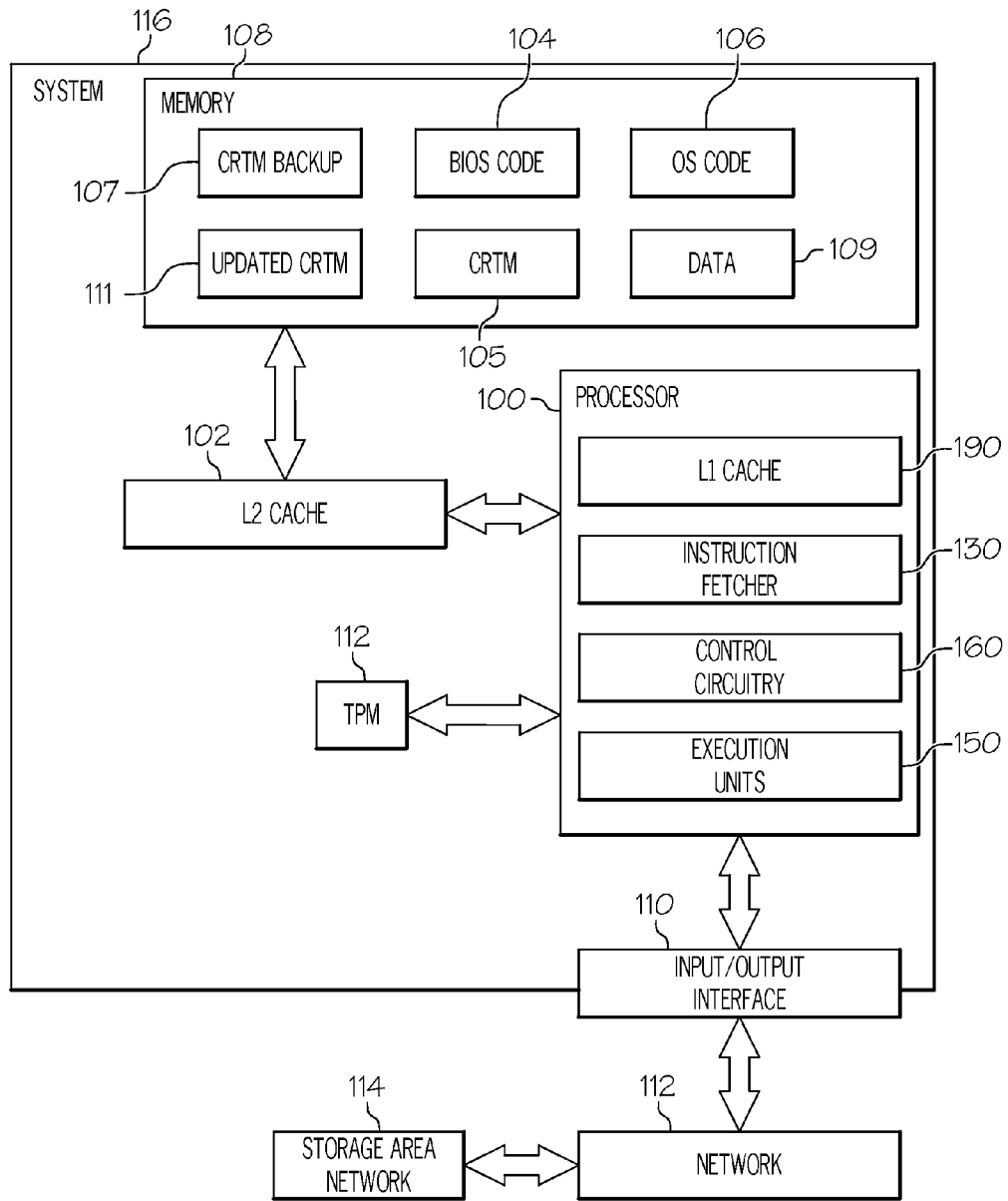
FIG. 1 depicts an embodiment of a computer with Core Root of Trust for Measurement (CRTM) code and updated CRTM code stored in a flash ROM and a Trusted Platform Module (TPM).

FIG. 1 shows a system 116 (herein sometimes referred to as a computing machine or system). System 116 can be, for example, a server or personal computer. System 116 comprises at least one processor 100 that can operate according to BIOS (Basis Input/Output System) Code 104 and Operating System (OS) Code 106. The BIOS and OS code is stored in memory 108. The BIOS code is typically stored on Read-Only Memory (ROM). In particular, the BIOS may be stored in flash ROM. The OS code is typically stored on the hard drive of system 116. Digital system 116 comprises a level 2 (L2) cache 102 located physically close to processor 100. Memory 108 also stores other programs for execution by processor 100 and stores data 109.

In an embodiment, memory 108 stores CRTM code 105, CRTM backup code 107, and updated CRTM code 111. CRTM code 105 comprises measuring algorithms to test the BIOS code. In particular, the CRTM code's primary role is to run a routine called SHA1 which is a measuring algorithm that tests the BIOS before any BIOS code is run. The BIOS code 104 is not locked and is updatable from within the OS. Hence, the BIOS 104 is not deemed secure. However, the area of flash ROM where the CRTM code is stored is locked. The output of the SHA1 algorithm is 20 bytes of data which are stored by CRTM code in the TPM (Trusted Platform Module) 112. This data is checked at every boot by software applications such as BitLocker for changes. If there is a change, then BitLocker will flag the change and, based on user policy, could stop the Operating System boot unless the user provides a unique key created while turning the BitLocker feature ON. In embodiments, the CRTM and the BIOS are typically stored in flash ROM.

Thus, some embodiments contemplate having a backup CRTM code. Both CRTM code 105 and CRTM backup code 107 may be updated by updated CRTM code 111. In system operation, when the system is restarted the CRTM code 105 begins to execute before the normal BIOS. CRTM code 105 will perform various functions including enabling the operation of L2 cache 102 and L1 cache 190. Also, the CRTM determines if an updated CRTM is available by checking the staging area of the ROM. The updated CRTM code 111 is stored in a different area of the flash ROM. If an update is available, then CRTM code 105 takes an execution path that simply jumps through at least some portions of the code. At each jump instruction, a block of CRTM code 105 is loaded into L2 cache 102, to be executed by the processor receiving the instructions from the L2 cache. By jumping through CRTM code 105 in this way, enough blocks of CRTM code 105 are copied into L2 cache to perform the update process, as described herein.

Thus, after the jumps through the code, the code continues to execute from the L2 cache. More particularly, an area of the L2 cache is specially designated to hold the blocks of CRTM code 105 that are brought into the L2 cache during the jump process. Once the jump process is complete, then CRTM code instructions are retrieved from L2 cache into the processor 100 for execution. That is, the CRTM code executes from the L2 cache, rather than from the ROM. The current CRTM code in the L2 cache causes the processor 100 to copy updated CRTM code 107 into the L2 cache from its storage location in ROM. Then, the processor 100, operating according to current CRTM instructions of CRTM code 105, writes the updated CRTM code to the flash ROM where the current CRTM was originally located, thus overwriting the CRTM code that was originally there.

Thus, new CRTM code 107 is stored in flash ROM in a staging area. For one embodiment, this is shown by the following table:

| Flash 64k Block Start Address | Block Description (Primary Bank) | Block Description (Backup Bank) |
| --- | --- | --- |
| 0xFFF0000 | CRTM 1 Staging Area | CRTM 1 Staging Area |
| 0xFFF1000 | CRTM 2 Staging Area | CRTM 2 Staging Area |
| 0xFFE2000 | BIOS | BIOS |
| 0xFFF3000 | BIOS | BIOS |
| 0xFFF4000 | CRTM 2 Run Time Code (locked) | CRTM 2 Run Time Code (locked) |
| 0xFFF5000 | BIOS | BIOS |
| 0xFFF6000 | BIOS | BIOS |
| 0xFFF7000 | BIOS | BIOS |
| 0xFFF8000 | BIOS | BIOS |
| 0xFFF9000 | BIOS | BIOS |
| 0xFFFA000 | BIOS | BIOS |
| 0xFFFB000 | BIOS | BIOS |

-continued

| Flash 64k Block Start Address | Block Description (Primary Bank) | Block Description (Backup Bank) |
|---|---|---|
| 0xFFFC000 | BIOS | BIOS |
| 0xFFFD000 | BIOS | BIOS |
| 0xFFFE000 | BIOS | BIOS |
| 0xFFFF000 | CRTM 1 Run Time Code (locked) | CRTM 1 Run Time Code (locked) |

In this embodiment current CRTM code is a combination of the current CRTM 1 run time code and the current CRTM 2 run time code. That is, the embodiment contemplates that the CRTM code may occupy more than one sector of memory. Similarly, updated CRTM code is a combination of update CRTM 1 and update CRTM 2. Update CRTM 1 and update CRTM 2 are stored in the CRTM1 and CRTM 2 staging areas, respectively. Thus, Update CRTM code 1, stored at 0xFFF0000, is to update CRTM 1 stored at 0xFFFF000 in the primary flash ROM bank and in the backup flash bank. Update CRTM code 2, stored at 0xFFF1000, is to update CRTM 2 stored at 0xFFF4000 in the primary and backup banks. Thus, the flash ROM is structured to have ah area for the primary CRTM and a backup CRTM. The ROM is further structured to store (stage) an updated CRTM code that can be copied into the area where the primary CRTM is stored.

Thus, embodiments contemplate having a backup copy of current CRTM code in case the primary current CRTM code is defective or corrupted. For example, IBM servers have system management software called Base Board Management Controller (BMC). This software can monitor and detect a reset and it expects the current CRTM code, once it starts executing from reset, to send a command which tells the BMC that the current CRTM code was fetched and is functional. If the BMC code does not see that command within 20 seconds it uses hardware to switch the server to boot from the backup flash bank. This could also be done manually for debugging purposes by installing a specific jumper on the planar/motherboard which also results in the backup flash bank being selected. Thus, the primary CRTM code and the backup CRTM code can be updated by update CRTM code stored in a staging area of the flash ROM.

Before current CRTM code (both CRTM 1 and CRTM 2 run time code shown in the table above) accepts new code and does a flash update to store the hew update CRTM code, the CRTM code executing from L2 cache will verify the signature on the code. The signature may be an enhanced checksum to make sure the new code has not been tampered with to compromise security. New code for CRTM may be signed using private keys and security algorithms before it is staged into the flash ROM. Operating System (OS) based flash tools can stage new code as a candidate for update but the current CRTM code (CRTM1 and CRTM2 run time code) is the code that will actually flash to replace CRTM1 and CRTM2 runtime code. The only portion of flash ROM locked is CRTM1 and CRTM2 run time code blocks, both in the primary and backup banks.

Note that there is a hardware method to select and switch between the primary and backup banks. Or the current CRTM code can switch between banks by setting a bit in hardware. Alternatively, a user could install a jumper and boot from the backup bank if the primary bank is corrupted. If a backup copy of the current CRTM code has to be updated, then the Operating System based flash tools stage the new CRTM code in the backup staging area for the run time CRTM code to use for flashing on the next reboot. If the primary copy of CRTM has to updated then new CRTM code is staged in the primary staging area in flash memory. At reboot, the CRTM runtime code from either flash bank can check for updates in the primary or backup bank, and can flash update (replace) the runtime CRTM code in the appropriate flash bank.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory and brings the instructions into cache memory. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to implement computer code.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

System 116 comprises a Trusted Platform Module (TPM) 102. The TPM 102 is a microcontroller that protects cryptographic keys, which provides for enhanced security of passwords and digital certificates. It typically affixes to the motherboard of a PC, but incorporates into any system where security is required. The main chip contains a special security controller with some internal, non-volatile ROM for the firmware, and non-volatile EEPROM for the data and RAM. Furthermore, it contains a cryptographic engine for performing encryption and decryption processes and hashing and a random number generator (needed to generate secure cryptographic keys).

The TPM offers protected storage, platform authentication, protected cryptographic processes and attestable state capabilities to provide the first level of trust for the computing platform. The foundation of this trust is the certification by a recognized authority that the platform can be trusted for an intended purpose. The Trusted Computing Group (TCG), a standards-setting entity, has defined and published a specification to enable trust and security capabilities on computing platforms in general. They define a trusted subsystem that can be integrated into every computing platform in order to build a secure computing base. The functions defined by the TCG are integrated into the TPM, which can be compared to an integrated smart card containing a CPU, some memory and special applications.

System 116 also typically includes other components and subsystems that are not shown in FIG. 1, such as: memory controllers, random access memory (RAM), peripheral drivers, a keyboard, a color video monitor, one or more flexible diskette drives, one or more removable non-volatile media drives such as a fixed disk hard drive, CD and DVD drives, a pointing device such as a mouse, and a network interface adapter, etc. Processor 100 may also communicate with a network 112 by way of Input/Output Device 110. The network may connect system 116 with a storage area network (SAN) of physical memory storage devices 114. These devices may include, for example, tape drive storage or hard disk arrays or other types of memory.

Thus, in one mode of operation of system 116, the L2 cache receives from memory 108 data and instructions expected to be processed in the processor pipeline of processor 100. L2 cache 102 is a fast memory located physically close to processor 100 to achieve greater speed. The L2 cache may receive from memory 108 the instructions for a plurality of instruction threads for one or more of a plurality of programs. Such instructions may include load and store instructions, branch instructions, arithmetic logic instructions, floating point instructions, etc. The L1 cache 190 is typically located as part of the processor 100 and contains data and instructions preferably received from L2 cache 102. Ideally, as the time approaches for a program instruction to be executed, the instruction is passed with its data, if any, first to the L2 cache, and then as execution time is near imminent, to the L1 cache. Typically, the closer to the processor the memory is, the more expensive it is and the faster it operates.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

A system 116 may be a server that has its own memory for storing its operating system, BIOS, and the code for executing application program and encryption key processing code, as well as files and data. As noted, the memory 108 of the system comprises Read-Only-Memory (ROM), cache memory implemented in DRAM and SRAM, a hard disk drive, CD drives and DVD drives. A server may also control access to other memory devices such as tape drives and hard disk arrays. Each server may store and execute its own application programs. Thus, some application programs, such as databases, may reside in a server and these programs may be available to computers in the network. Further, the server may be connected through one or more ports to a local storage area network (SAN). The SAN may comprise magnetic disks of differing types and speeds.

Thus, one embodiment is a system for updating Core Root Of Trust for Measurement (CRTM) computer code in a computing machine. The system comprises a flash Read Only Memory (ROM) to store a primary CRTM code and to store a backup CRTM code, and to store a copy of updated CRTM code. The system also comprises a cache memory to receive either primary or backup CRTM code and to provide the received CRTM code to a processor for execution when CRTM code is to be updated. The system further comprises a processor to execute CRTM code first from the ROM, and then, if CRTM is to be updated, to execute CRTM code from the cache memory. The processor further is to copy updated CRTM code from the ROM to the cache; and to copy the updated CRTM code to the ROM where the primary copy of the CRTM is stored.

In some embodiments, the processor is further to determine if primary CRTM code is defective. If so, the processor switches to a backup CRTM code if the primary CRTM code is defective. The processor may further execute code to verify a signature of the updated CRTM code. If the signature is not verified, the processor may further switch to a backup copy of the updated CRTM code. In some embodiments, the cache memory is logically partitioned to reserve an area of memory for a heap and a stack for computer code to verify the signature. In some embodiments the cache memory is logically partitioned to reserve an area of memory for storing the updated CRTM code.

Figure 2:
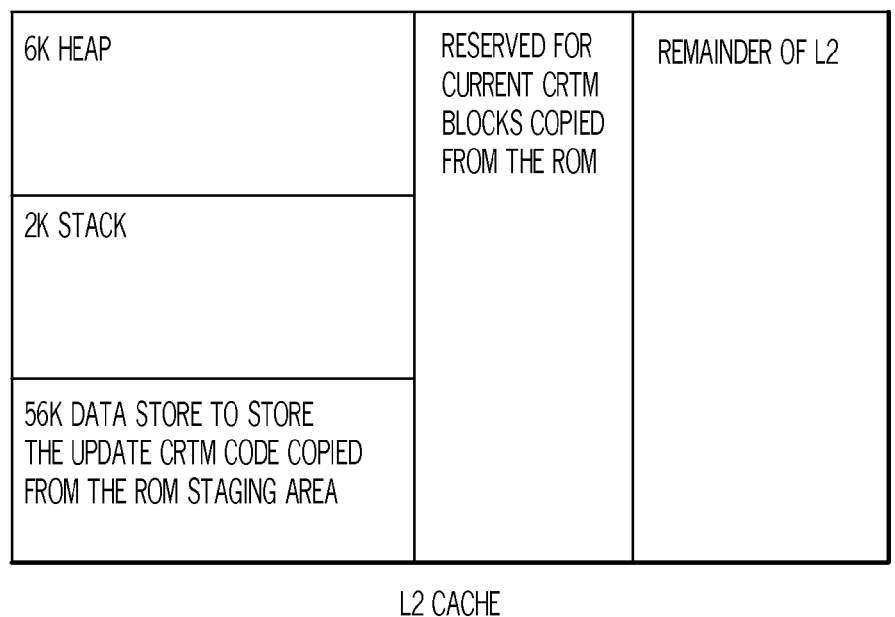
FIG. 2 depicts an embodiment of a logical partition of an L2 cache of a computer system incorporating a CRTM code update mechanism.

FIG. 2 shows a logical partition of the L2 cache 102 according to one embodiment. A 64K area of the cache is divided into a 6K heap area, a 2K stack area, and a 56K data store area to store the updated CRTM code copied from the staging area of the ROM. To verify the signature of the updated CRTM code, C code is executed. The stack is used by the C code to save and restore data when calling and returning from routines. The heap is used by the C code to allocate some local buffers for use. The data store is where a copy of new CRTM code is copied from the staging area before performing the flash erase and program operation on a flash sector. In one embodiment, each flash sector is 64K in size and 56K of each sector is used for new CRTM code. Also, a logical partition is created to store blocks of current CRTM copied into the L2 cache.

Figure 3:
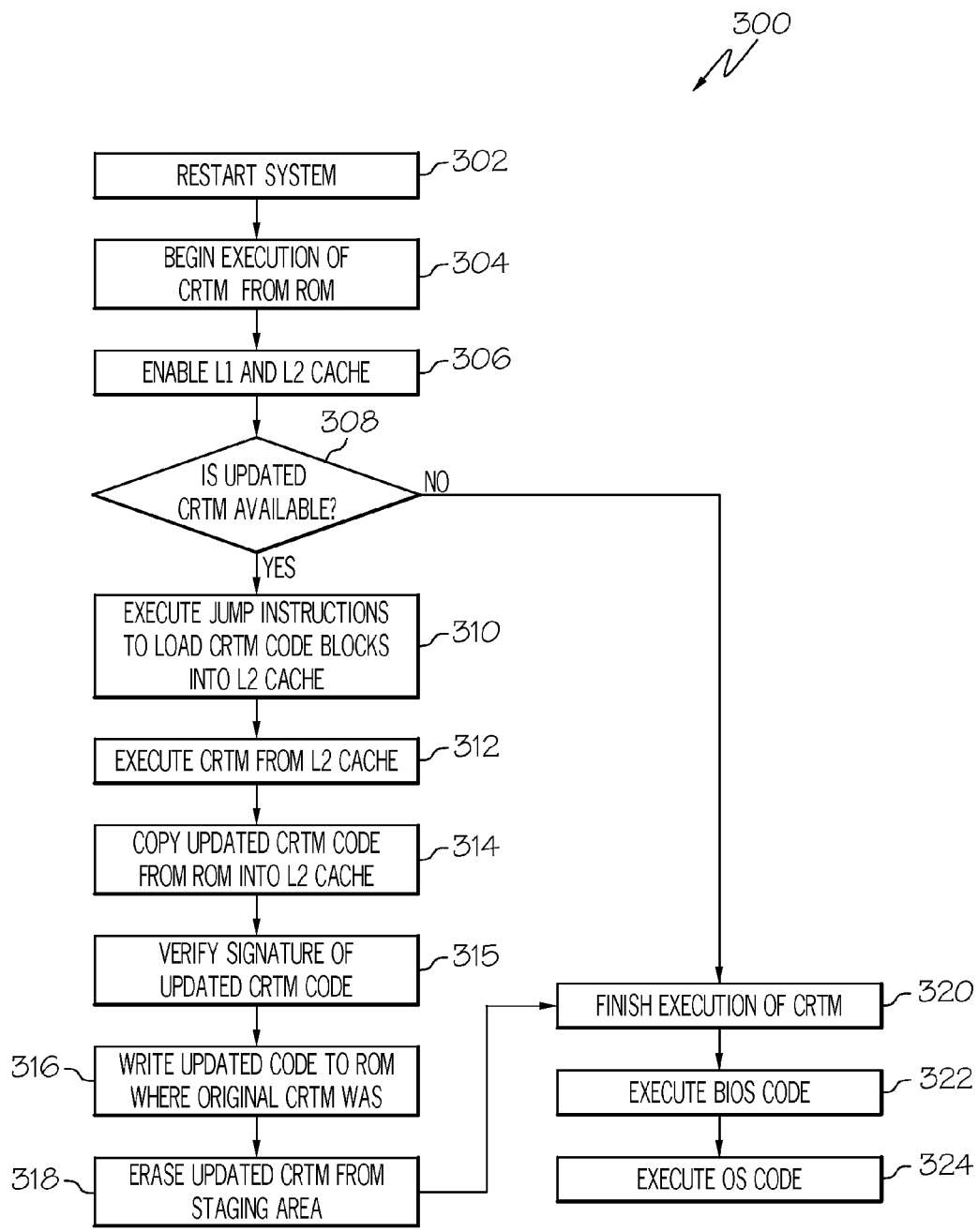
FIG. 3 depicts a flowchart of an embodiment for updating CRTM code in a computer with flash ROM.

FIG. 3 shows a flow chart 300 of one embodiment for updating CRTM code. At first, the user restarts the computing system (element 302). The computing system immediately begins to execute current CRTM code from flash ROM (element 304). One of the first things that the current CRTM code does is enable the L1 and L2 cache of the computing system (element 306). During the initial stages of its execution, the current CRTM code determines if an updated CRTM coders available (element 308). The current CRTM code determines if an updated CRTM code is available by checking for valid code in the staging area where the updated CRTM is stored in the ROM. If an updated CRTM code is not available, then the current CRTM Code finishes executing (element 320). If an updated CRTM code is available, then the computing system will execute jump instructions of the current CRTM code to bring blocks of the current CRTM code into the L2 cache of the computing system (element 310). As discussed above with reference to FIG. 1, processor 100 comprises an instruction fetcher 130 to bring blocks of instructions from the flash ROM into the L2 cache in advance of execution of the instructions.

Upon completion of the jump instructions, the current CRTM code is executed from the L2 cache (element 312). The current CRTM code instructions from the L2 cache that the processor executes cause the instruction fetcher to load the updated CRTM instructions into the L2 cache from the staging area of the ROM (element 314). Then the current CRTM code is executed to verify the signature of the updated CRTM code (element 315). This process of verification may involve use of an encryption key in Trusted Platform Module (TPM) 102. Then, still executing the original CRTM from the L2 cache, the processor writes the updated code to the flash ROM where the original CRTM was located (element 316). The computing system also erases the updated CRTM code from the staging area in the flash ROM (element 318). The system then finishes execution of the original CRTM code (element 320). The system then executes the BIOS code (element 322) and proceeds to execute Operating System code (element 324). The next time the system is restarted, the new updated CRTM copied into the ROM is executed.

Thus, another embodiment is a method to update CRTM code in a computer. The method comprises executing a current CRTM code stored in a ROM to enable a cache memory and to determine if an updated CRTM code is available in a staging area of the ROM, If an updated CRTM code is available, then the computer executes jump instructions in the current CRTM code to copy blocks of the current CRTM code into the cache memory. The method further comprises executing the CRTM code copied into the cache memory, to copy the updated CRTM code from the staging area of the ROM to the cache memory, and to copy the updated CRTM code from the cache memory to the place in ROM where the current CRTM code is stored.

The method may further comprise executing the current CRTM code copied into the cache memory to erase the updated CRTM code from the staging area of the ROM. Alternatively, the method may comprise executing the current CRTM code from the ROM to erase the updated CRTM code from the staging area of the ROM. In some embodiments, the method may further comprise logically partitioning the cache memory to reserve an area of the memory to store the updated CRTM code. The cache may be partitioned to form a reserved area for a stack and a heap used by code to verify a signature of the updated CRTM. Thus, some embodiments further comprise verifying a signature of the updated CRTM code.

Some embodiments can take the form of an entirely hardware embodiment, an entirely software embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection with a server such as shown in FIG. 1, or any instruction execution system.

For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment is a computer program product comprising a computer useable medium having a computer readable current CRTM code, wherein the computer readable current CRTM code when stored in a ROM of the computer and when executed by a processor of the computer causes the computer to update the CRTM code. The operations comprise enabling a cache memory of the computer. The operations further comprise determining if an updated CRTM code is available in a staging area of the ROM. If an updated CRTM code is available, then the operations comprise executing jump instructions in the current CRTM code to copy blocks of the current CRTM code into the cache memory. The operations further comprise executing the CRTM code copied into the cache memory to copy the updated CRTM code from the staging area of the ROM to the cache memory, and to copy the updated CRTM code from the cache memory to the place in ROM where the current CRTM code is stored.

In some embodiments, the operations further comprise verifying a signature of the updated CRTM code. An embodiment may further comprise logically partitioning the cache memory to reserve an area for a stack and a heap used by code to perform the signature verification. The cache may be logically partitioned to reserve an area to store the updated CRTM code. Some embodiments may further comprise switching from obtaining current CRTM code from a primary bank of ROM to a backup bank of ROM.

Although the present invention and some of its advantages have been described in detail for some embodiments, it should be understood that various changes, substitutions and alterations in the described embodiments can be made herein without departing from the spirit and scope of the invention as defined by the appended claims. Although ah embodiment described herein may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system for updating Core Root Of Trust for Measurement (CRTM) code in a computing machine, comprising:
   a flash Read Only Memory (ROM) to store a primary CRTM code in a locked area and to store a backup CRTM code, and to store updated CRTM code;
   a cache memory to receive the primary CRTM code and to provide the received CRTM code to a processor for execution if the primary CRTM code is to be updated; and a processor:
      to execute the primary CRTM code from the ROM as current CRTM code before executing a Basic Input/Output System (BIOS) code, wherein the execution of the current CRTM code comprises measurement of the BIOS code, enablement of the cache memory, and determination if the updated CRTM code is available in a staging area of the ROM;
      if the updated CRTM code is available based on the determination, to execute jump instructions in the current CRTM code to copy blocks of the current CRTM code into the cache memory; and
      to execute the current CRTM code copied into the cache memory to copy the updated CRTM code from the staging area of the ROM to the cache memory, and to copy the updated CRTM code from the cache memory to the locked area in the ROM.

2. The system of claim 1, wherein the processor is further to determine if the primary CRTM code is defective.

3. The system of claim 2, wherein the processor further switches the current CRTM code to be the backup CRTM code if the primary CRTM code is defective.

4. The system of claim 1, wherein the processor is further to verify a signature of the updated CRTM code.

5. The system of claim 4, wherein if the signature is not verified, the processor is further to switch to a backup copy of the updated CRTM code.

6. The system of claim 4, wherein the cache memory is logically partitioned to reserve an area of memory for a heap and a stack for computer code to verify the signature.

7. The system of claim 1, wherein the cache memory is logically partitioned to reserve an area of memory for a heap and a stack for computer code to verify a signature of the updated CRTM code.

8. The system of claim 1, wherein the cache memory is logically partitioned to reserve an area of memory for storing the updated CRTM code.

9. A method to update Core Root Of Trust for Measurement (CRTM) code in a computer, comprising:

executing a current CRTM code from a locked area in Read Only Memory (ROM) before executing a Basic Input/Output System (BIOS) code, wherein the execution of the current CRTM code comprises measurement of the BIOS code, enablement of a cache memory, and determination if an updated CRTM code is available in a staging area of the ROM;

if the updated CRTM code is available based on the determination, then executing jump instructions in the current CRTM code to copy blocks of the current CRTM code into the cache memory; and executing the current CRTM code copied into the cache memory to copy the updated CRTM code from the staging area of the ROM to the cache memory, and to copy the updated CRTM code from the cache memory to the locked area in the ROM.

10. The method of claim 9, further comprising executing the current CRTM code copied into the cache memory to erase the updated CRTM code from the staging area of the ROM.

11. The method of claim 9, further comprising executing the current CRTM code from the ROM to erase the updated CRTM code from the staging area of the ROM.

12. The method of claim 9, further comprising logically partitioning the cache memory to reserve an area of the memory to store the updated CRTM code.

13. The method of claim 9, wherein executing the current CRTM code further comprises verifying a signature of the updated CRTM code.

14. The method of claim 13, further comprising logically partitioning the cache memory to reserve an area of the memory to store a stack and a heap for code to verify the signature.

15. The method of claim 9, further comprising logically partitioning the cache memory to reserve an area of the memory to store a stack and a heap for code to verify a signature of the updated CRTM code.

16. A computer program product comprising a computer useable medium having a computer readable current Core Root Of Trust for Measurement (CRTM) code, wherein the computer usable medium is not a propagation medium and wherein the computer readable current CRTM code is stored in a locked area in Read Only Memory (ROM) of the computer and when executed by a processor of the computer causes the computer to:

before a Basic Input/Output System (BIOS) code executes, execute the current CRTM code from the ROM to enable a cache memory of the computer and determine if an updated CRTM code is available in a staging area of the ROM, wherein the execution of the current CRTM code comprises measurement of the BIOS code;

if the updated CRTM code is available based on the determination, then execute jump instructions in the current CRTM code to copy blocks of the current CRTM code into the cache memory; and execute the current CRTM code copied into the cache memory to copy the updated CRTM code from the staging area of the ROM to the cache memory, and to copy the updated CRTM code from the cache memory to the locked area in ROM.

17. The computer program product of claim 16, further comprising to verify a signature of the updated CRTM code.

18. The computer program product of claim 17, further comprising logically partitioning the cache memory to reserve an area for a stack and a heap used by code to perform the signature verification.

19. The computer program product of claim 16, further comprising logically partitioning the cache memory to reserve an area to store the updated CRTM code.

20. The computer program product of claim 16, further comprising switching from obtaining current CRTM code from a primary bank of ROM to a backup bank of ROM.

\* \* \* \* \*